(12) United States Patent
Chen et al.

(10) Patent No.: US 8,417,385 B2
(45) Date of Patent: Apr. 9, 2013

(54) HOME APPLIANCE CONTROL DEVICE

(75) Inventors: Fu Chen Chen, Hsin-Chu (TW); Hsin Chia Chen, Hsin-Chu (TW); Yi Hsien Ko, Hsin-Chu (TW); Ming Tsan Kao, Hsin-Chu (TW)

(73) Assignee: Pixart Imaging Inc. (TW)

( * ) Notice: Subject to any disclaimer, the term of this patent is extended or adjusted under 35 U.S.C. 154(b) by 0 days.

(21) Appl. No.: 13/225,446

(22) Filed: Sep. 4, 2011

(65) Prior Publication Data
US 2011/0320013 A1 Dec. 29, 2011

Related U.S. Application Data

(63) Continuation-in-part of application No. 12/496,383, filed on Jul. 1, 2009, now Pat. No. 8,116,912.

(51) Int. Cl.
*G05B 15/02* (2006.01)
(52) U.S. Cl. .................. 700/275; 700/12; 700/276
(58) Field of Classification Search .................. 700/12, 700/66, 83, 85, 275, 276, 277, 278, 299, 700/300; 345/157, 173, 419, 420; 382/106, 382/154; 340/4.3
See application file for complete search history.

(56) References Cited

U.S. PATENT DOCUMENTS

| | | | |
|---|---|---|---|
| 5,180,333 A | 1/1993 | Shyu | |
| 5,839,654 A | 11/1998 | Weber | |
| 7,084,774 B2 | 8/2006 | Martinez | |
| 7,272,945 B2 | 9/2007 | Bash et al. | |
| 7,433,024 B2 * | 10/2008 | Garcia et al. | 356/4.01 |
| 7,783,382 B2 | 8/2010 | Huang et al. | |
| 7,860,612 B2 | 12/2010 | Huang et al. | |
| 8,050,461 B2 * | 11/2011 | Shpunt et al. | 382/106 |
| 8,150,142 B2 * | 4/2012 | Freedman et al. | 382/154 |
| 2005/0103876 A1 | 5/2005 | Martinez | |
| 2005/0187664 A1 | 8/2005 | Bash et al. | |
| 2007/0109272 A1* | 5/2007 | Orsley et al. | 345/173 |
| 2007/0109273 A1* | 5/2007 | Orsley et al. | 345/173 |
| 2007/0216894 A1* | 9/2007 | Garcia et al. | 356/4.01 |
| 2008/0106746 A1* | 5/2008 | Shpunt et al. | 356/610 |
| 2009/0210193 A1 | 8/2009 | Nagase | |
| 2009/0267895 A1* | 10/2009 | Bunch | 345/157 |
| 2010/0020078 A1* | 1/2010 | Shpunt | 345/420 |
| 2010/0118123 A1* | 5/2010 | Freedman et al. | 348/46 |

(Continued)

FOREIGN PATENT DOCUMENTS

| | | |
|---|---|---|
| CN | 101493246 | 7/2009 |
| JP | 10259942 | 9/1998 |

(Continued)

OTHER PUBLICATIONS

P. Grossmann, "Depth from focus," Pattern Recognition Letters, pp. 63-69 (1987).

(Continued)

*Primary Examiner* — Charles Kasenge
(74) *Attorney, Agent, or Firm* — Lowe Hauptman Ham & Berner, LLP

(57) ABSTRACT

There is provided a home appliance control device for obtaining various parameters of each active object according to a variation between a plurality of current images acquired by an image sensor or according to a relation of a current image acquired by the image sensor with respect to a reference image or a reference data thereby determining an operation state of a home appliance.

14 Claims, 13 Drawing Sheets

U.S. PATENT DOCUMENTS

| | | | |
|---|---|---|---|
| 2010/0194687 A1* | 8/2010 | Corson et al. | 345/158 |
| 2010/0194870 A1 | 8/2010 | Ghita et al. | |
| 2010/0214214 A1* | 8/2010 | Corson et al. | 345/158 |
| 2010/0290698 A1* | 11/2010 | Freedman et al. | 382/154 |
| 2011/0158508 A1* | 6/2011 | Shpunt et al. | 382/154 |
| 2011/0211044 A1* | 9/2011 | Shpunt et al. | 348/46 |
| 2011/0261163 A1* | 10/2011 | Austin et al. | 348/46 |
| 2011/0292036 A1* | 12/2011 | Sali et al. | 345/419 |
| 2012/0051588 A1* | 3/2012 | McEldowney | 382/103 |

FOREIGN PATENT DOCUMENTS

| | | |
|---|---|---|
| JP | 2001355898 | 12/2001 |
| TW | 172101 | 11/1991 |
| TW | M340479 | 9/2008 |
| WO | 2007043036 | 4/2007 |

OTHER PUBLICATIONS

A. Levin et al., "Image and depth from a conventional camera with a coded aperture," ACM Transactions on Graphics, vol. 26, No. 3, 2007.

M. Subbarao et al., "Depth from defocus: A spatial domain approach," International Journal of Computer Vision, vol. 13, No. 3, pp. 271-294 (1994).

* cited by examiner

HOME APPLIANCE CONTROL DEVICE

CROSS REFERENCE TO RELATED APPLICATION

This application is a continuation-in-part application of U.S. Ser. No. 12/496,383, filed on Jul. 1, 2009, the full disclosure of which is incorporated herein by reference.

BACKGROUND

1. Field of the Invention

This invention generally relates to a home appliance control device and, more particularly, to a home appliance control device and a control method thereof that can determine an operation state of a home appliance according to various parameters of each active object.

2. Description of the Related Art

Conventional air conditioners use a temperature sensor to sense an indoor temperature so as to accordingly adjust the wind strength of the air conditioner and the indoor temperature. However, because the temperature sensor is generally installed at a fixed position, e.g. inside the air conditioner, the temperature sensed by the temperature sensor is generally not able to reflect an actual temperature variation instantly. Therefore, the temperature adjusting efficiency will be degraded and the machine will consume much more power. In addition, because the wind direction of conventional air conditioners can not be adjusted according to the position of people, it is difficult to adjust the indoor temperature to a comfortable condition.

Therefore, the industry proposed a method for controlling an air conditioner according to infrared images captured by an infrared image sensor. For example, Japanese Patent Publication No. 10-259942 discloses "A control device of an air conditioner" which includes an infrared image sensor, a status determining circuit and a control circuit. The infrared image sensor is for photographing the interior of a room. The status determining circuit determines the number, position, action, movement or the amount of clothes of people in the room based on the images captured by the infrared image sensor. The control circuit controls an operational status, e.g. the wind direction and wind strength, of the air conditioner according to a determined result of the status determining circuit.

However, the control device mentioned above determines a status mainly based on the images captured by one infrared image sensor, but in this way the control device is not able to perform corresponding control according to a distance between human bodies and the air conditioner. Therefore, the present invention further provides a home appliance control device and a control method thereof that can calculate a static parameter and a dynamic parameter of at least one active object with respect to a home appliance so as to accordingly adjust the output and directivity of the home appliance thereby improving the operation efficiency thereof.

SUMMARY

The present invention provides a control device and a control method of a temperature controller, wherein the control device and the control method adjust the wind strength and/or wind direction of the temperature controller according to a distance between at least one active object and the temperature controller so as to effectively adjust the indoor temperature and reduce the consumption power of the temperature controller.

The present invention further provides a home appliance control device and a control method thereof for obtaining various parameters of each active object according to a variation between a plurality of current images acquired by an image sensor or according to a relation of a current image acquired by the image sensor with respect to a reference image or a reference data thereby determining an operation state of a home appliance.

The present invention provides a home appliance control device for controlling an operation state of a home appliance. The home appliance control device includes a light source module, a first image sensor, a processing unit and a control unit. The light source module is configured to project a predetermined optical pattern to at least one active object. The first image sensor is configured to acquire a current image containing at least one active object image and the predetermined optical pattern. The processing unit is for comparing the current image with a reference image or a reference data to obtain a static parameter and a dynamic parameter associated with the active object. The control unit is for controlling the operation state of the home appliance according to the static parameter and the dynamic parameter.

In an aspect, the reference image is an image acquired by the first image sensor when the active object is at a predetermined distance; and the processing unit calculates a displacement between the active object image in the current image and the active object image in the reference image to accordingly calculate the static parameter.

In an aspect, the reference data are point spread functions associated with difference object distances or the predetermined optical pattern acquired at different object distances.

In an aspect, the light source module further includes a laser light source and an optical component. The predetermined optical pattern projected by the laser light source through the optical component is a speckle pattern, and the reference data is the speckle pattern associated with difference object distances.

The present invention further provides a home appliance control device for controlling an operation state of a home appliance. The home appliance control device includes a first image sensor, a processing unit and a control unit. The first image sensor has a variable aperture or a variable focus, and is configured to acquire a plurality of current images of at least one active object through the variable aperture or the variable focus, wherein every current image corresponds to different aperture values or focus values. The processing unit is for comparing the current images with each other to obtain a static parameter and a dynamic parameter associated with the active object. The control unit is for controlling the operation state of the home appliance according to the static parameter and the dynamic parameter.

In an aspect, the processing unit obtains the static parameter and the dynamic parameter by using depth from defocus technique or depth from focus technique according to the current images.

The present invention further provides a home appliance control device for controlling an operation state of a home appliance. The home appliance control device includes a first image sensor, a processing unit and a control unit. The first image sensor has a coded aperture and is configured to acquire a current image of at least one active object through the coded aperture. The processing unit is for comparing the current image with a reference data to obtain a static parameter and a dynamic parameter associated with the active object. The control unit is for controlling the operation state of the home appliance according to the static parameter and the dynamic parameter.

In the home appliance control device of the present invention, the dynamic parameter may be obtained according to a variation of a plurality of static parameters. The static parameter may be a number, a position and/or a distance of the active object, and the dynamic parameter may be an activity level and/or an activity range of the active object.

In the home appliance control device of the present invention, the operation state may be an output or a directivity of a home appliance, and the home appliance may be a temperature controller, a directivity loudspeaker or a directivity electronic device, but not limited thereto.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE EMBODIMENT

It should be noticed that, wherever possible, the same reference numbers will be used throughout the drawings to refer to the same or like parts.

Figure 1:
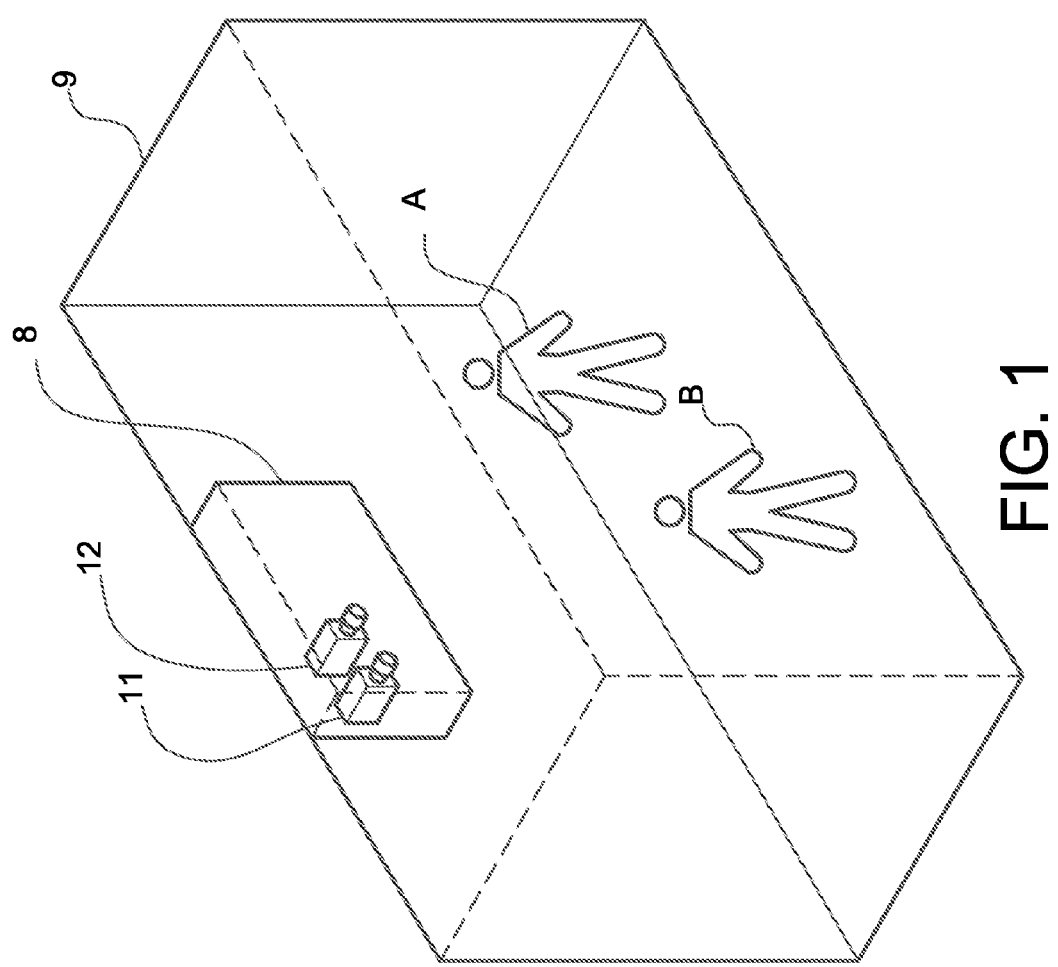
FIG. 1 shows a schematic diagram of the use of the temperature controller according to the first embodiment of the present invention.

Please refer to FIG. 1, it shows a schematic diagram of the use of the temperature controller 8 according to the first embodiment of the present invention. In this embodiment, the temperature controller 8 is shown as an air conditioner, but the present invention is not limited to this embodiment. Other embodiment of the temperature controller 8 includes, for example, a fan. The temperature controller 8 is for adjusting the temperature of an environment having at least one active object, wherein the active object may be a human body or an animal. For example, in one embodiment as shown in FIG. 1, the temperature controller 8 is installed in an indoor space 9 for adjusting the environment temperature of the indoor space 9, but the present invention is not limited to this embodiment. For example, if the temperature controller 8 is a fan, it may be operated outdoor.

Figure 2:
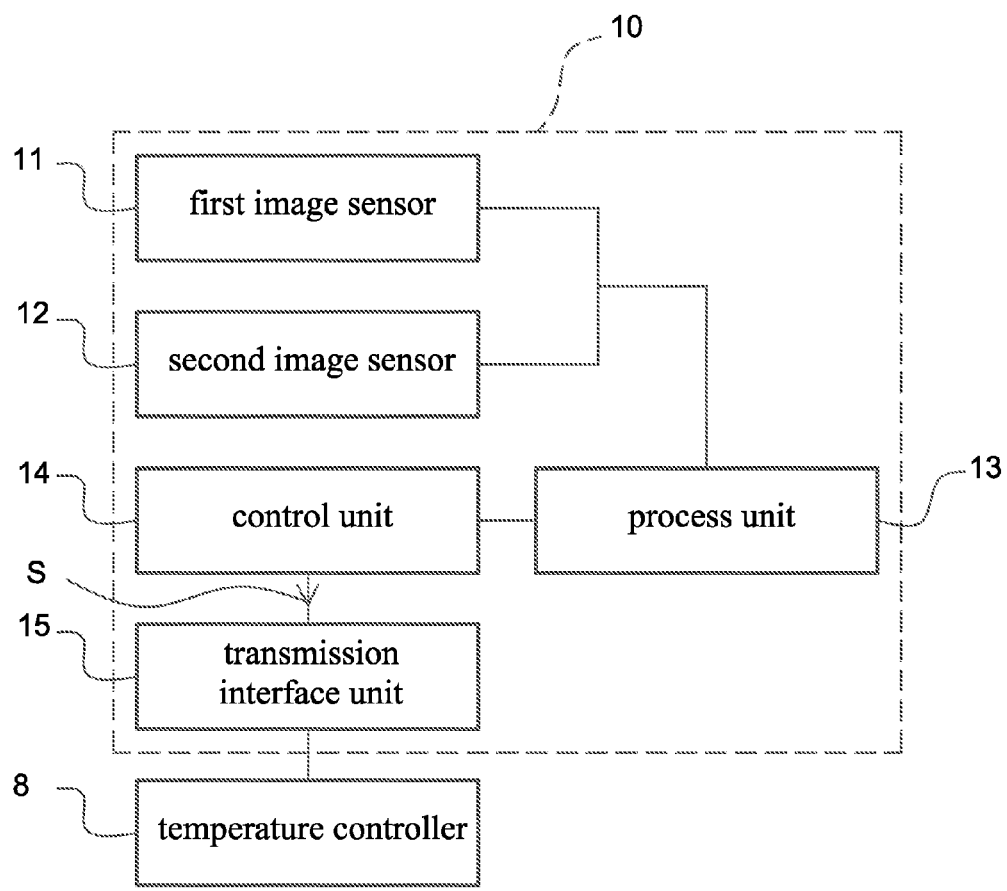
FIG. 2 shows a block diagram of the control device of a temperature controller according to the first embodiment of the present invention.

Please refer to FIGS. 1 and 2, the temperature controller 8 is coupled to a control device 10 (the control device 10 may be disposed either inside or outside the temperature controller 8). The control device 10 includes a first image sensor 11 and a second image sensor 12 for capturing images of the active object in the indoor space 9. For example, in this embodiment, there are two active objects "A" and "B" in the indoor space 9, and the active object "A" is closer to the temperature controller 8 than the active object "B" is. In this embodiment, the control device 10 can obtain a disparity map according to the images captured by the first image sensor 11 and the second image sensor 12, and then obtain the distance from each active object in the indoor space 9 to the temperature controller 8. The distance may be, for example, an average distance between the active objects "A", "B" and the temperature controller 8, a nearest distance (the distance between the active object "A" and the temperature controller 8), and a longest distance (the distance between the active object "B" and the temperature controller 8). The control device 10 also adjusts an operational status, e.g. the wind strength and/or wind direction, of the temperature controller 8 according to the obtained distance. In addition, it is able to obtain static parameters, e.g. the position of each active object and the number of the active object, and dynamic parameters, e.g. the movement and motion range of each active object, by using the disparity map. The control device 10 may control the operational status of the temperature controller 8 according to one of or a combination of the static parameters and the dynamic parameters.

Please refer to FIG. 2 again, it shows a block diagram of the control device 10 of a temperature controller according to the first embodiment of the present invention. The control device 10 includes a first image sensor 11, a second image sensor 12, a process unit 13, a control unit 14 and a transmission interface unit 15. Embodiments of the first image sensor 11 and the second image sensor 12 include a charge-coupled device (CCD) image sensor and a complementary metal-oxide semiconductor (CMOS) image sensor, and the first image sensor 11 and the second image sensor 12 are for capturing images containing the image of at least one active object. For example, in the first embodiment, the first image sensor 11 and the second image sensor 12 capture images of the indoor space 9 where the temperature controller 8 is installed. There is a transverse distance between the first image sensor 11 and the second image sensor 12. The process unit 13 is coupled to the first image sensor 11 and the second image sensor 12 for calculating a disparity map according to the images captured by the first image sensor 11 and the second image sensor 12 (the calculation process will be described in the following paragraphs), and for calculating a distance between each active object in the indoor space 9 and the temperature controller 8 and for calculating other parameters, such as the position, action, number, motion range and movement of each active object. The control unit 14 is coupled to the process unit 13 and generates a control signal "S" according to a result obtained by the process unit 13 so as to control an operational status, for example, but not limited to, the wind strength and/or wind direction, of the temperature controller 8. The transmission interface unit 15 is coupled to the control unit 14 for transmitting the control signal "S" to the temperature controller 8 so as to perform corresponding control.

Figure 3:
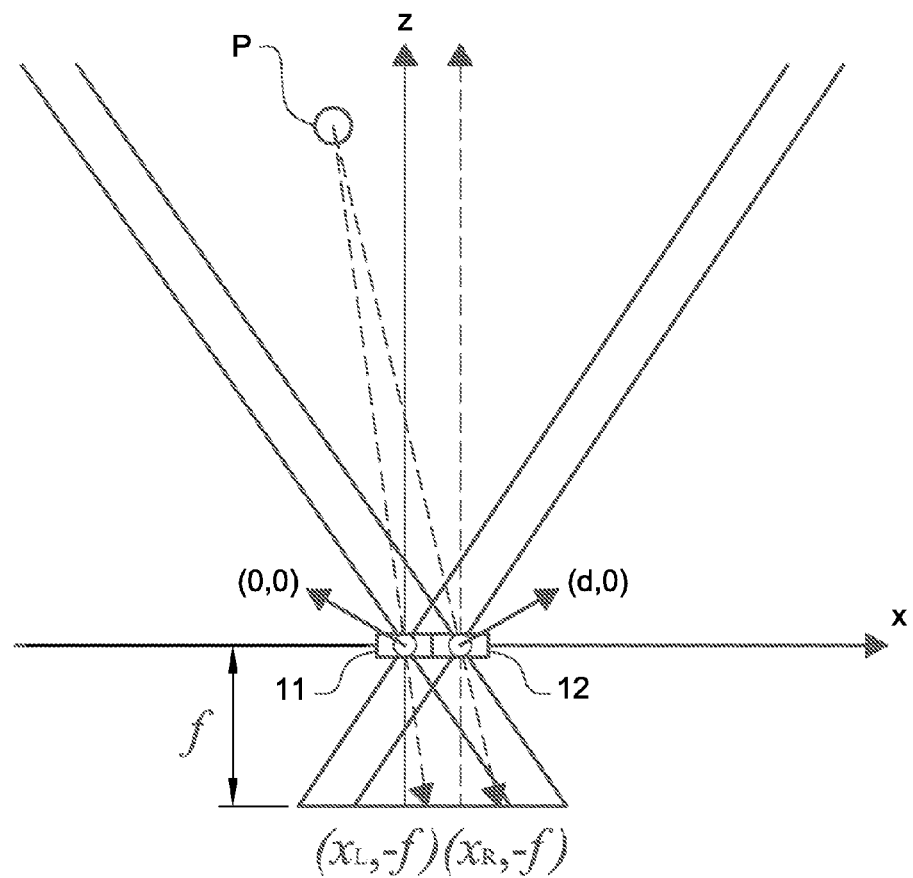
FIG. 3 shows a schematic diagram of the calculation of a disparity map in the control method of a temperature controller according to the first embodiment of the present invention.

Please refer to FIG. 3, it shows a method for calculating the disparity map according to the first embodiment of the present invention, wherein it is assumed that the transverse distance between the first image sensor 11 and the second image sensor 12 is "d"; the line that the first image sensor 11 and the second image sensor 12 located is x-axis; and there is a z-axis perpendicular to the x-axis. The first image sensor 11 is assumed to be located at the intersection of the x-axis and the z-axis, and the intersection herein is assumed to be the original point (0, 0); thus, the coordinate of the second image sensor 12 is (d, 0). In this embodiment, the first image sensor 11 and the second image sensor 12 respectively capture the image of a point "P" in the space formed by the x-axis and the z-axis, and it is assumed herein that the focal distance of the first image sensor 11 and the second image sensor 12 is "f". Thus, the image coordinate of the point "P" is $(x_L, -f)$ in the image captured by the first image sensor 11 and is $(x_R, -f)$ in the image captured by the second image sensor 12. Then, it is able to obtain two relational equations (1) and (2) as:

$$z/x = -f/x_L \quad (1)$$

$$z/(x-d) = -f/(x_R-d) \quad (2)$$

The position of the point "P" can be expressed as equations (3) and (4) by simply rewriting the equations (1) and (2).

$$x = d/(1-(x_R-d)/x_L) \quad (3)$$

$$z = f \times d/(x_R - x_L - d) \quad (4)$$

The position of the point "P" relative to the first image sensor 11 and the second image sensor 12 could be obtained according to equation (3), and the distance of the point "P" from the first image sensor 11 and the second image sensor 12 could be obtained according to equation (4). It also can be understood from equation (4) that, when the value of $(x_R-x_L-d)$ becomes smaller, the distance of the point "P" from the first and second image sensors is longer, and $(x_R-x_L-d)$ is referred to disparity herein. One disparity value can be obtained according to each pixel in the sensing array (not shown) of the first image sensor 11 and the pixel at a corresponding position of the sensing array (not shown) of the second image sensor 12. The process unit 13 forms a 2-dimensional disparity map according to disparities obtained from all pixels in the sensing arrays of the first and second image sensors and accordingly identifies the distance of each active object from the temperature controller 8 according to the disparity map. In the obtained 2-dimensional disparity map, $(x_R-x_L-d)$ can be identified from the brightness. For example, when the brightness of the point "P" in the disparity map becomes higher, the value of $(x_R-x_L-d)$ becomes higher and the point "P" is closer to the first and second image sensors; on the contrary, when the brightness of the point "P" in the disparity map becomes lower, the value of $(x_R-x_L-d)$ becomes smaller and the point "P" is farer from the first and second image sensors. In this manner, a 2-dimensional image with different brightness levels can be obtained. The process unit 13 obtains static parameters, e.g. the position, number and distance of each active object, and dynamic parameters, e.g. the movement and motion region of each active object, according to the disparity map. For example, the movement can be obtained by calculating the correlation between two disparity maps. When the number of the active object is more than one, the distance between the active object and the temperature controller 8 may be, for example, an average distance, a nearest distance and a longest distance between the plurality of the active objects and the temperature controller 8, but the present invention is not limited to these embodiments. The control unit 14 generates a control signal according to one of or a combination of the static parameters and the dynamic parameters obtained by the process unit 13. The transmission interface unit 15 transmits the control signal to the temperature controller 8 so as to perform corresponding control.

Figure 4:
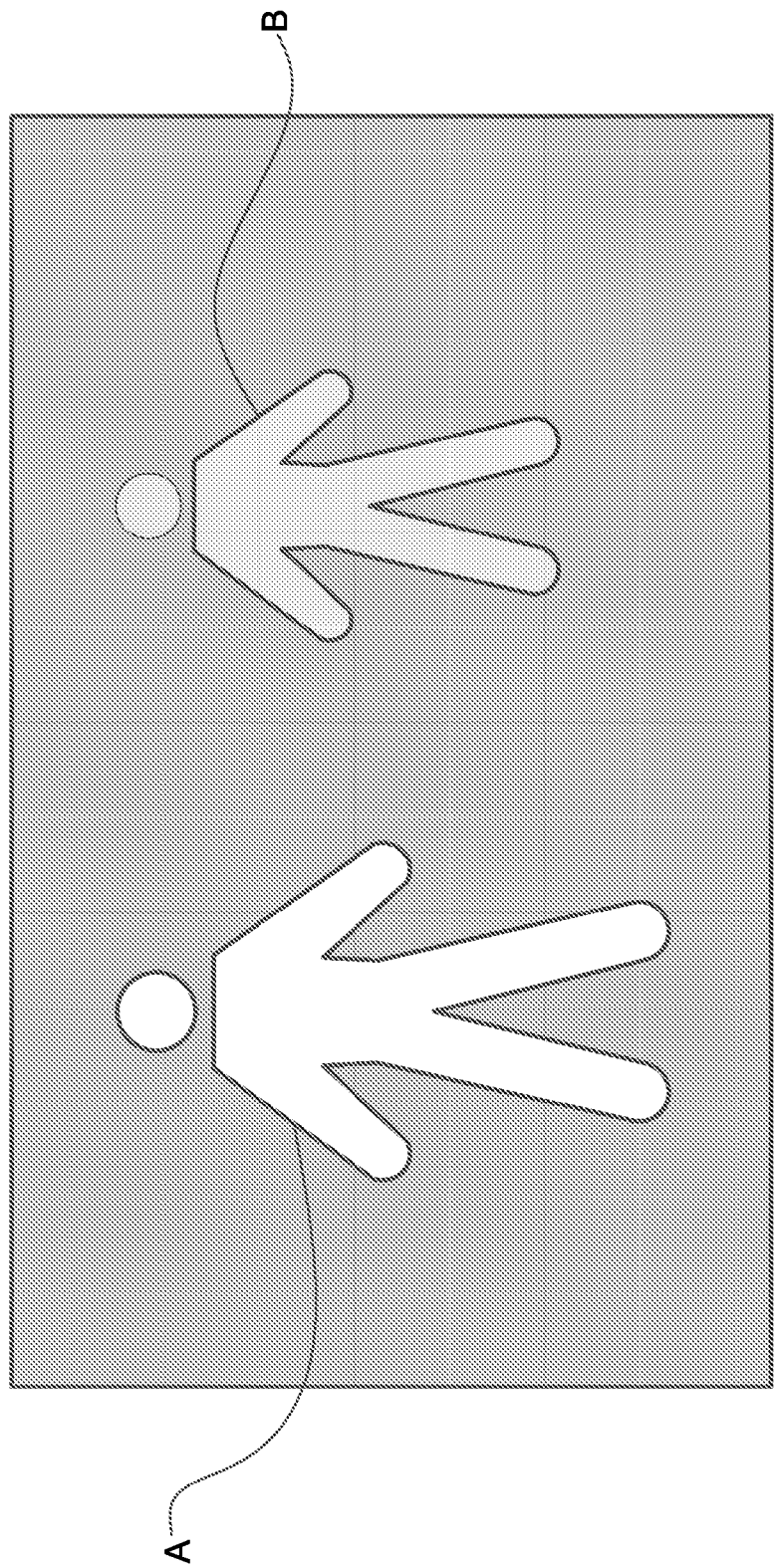
FIG. 4 shows an exemplary disparity map calculated by the control device of a temperature controller according to the first embodiment of the present invention, wherein the brightness becomes higher when the active object is closer to the temperature controller.

Please refer to FIG. 4, it shows a 2-dimensional disparity map obtained from the images captured by the first image sensor 11 and the second image sensor 12 shown in FIG. 1, wherein because the active object "A" is closer to the temperature controller 8, it has the highest brightness (shown as white color); because the active object "B" is farer from the temperature controller 8, it has a lower brightness (shown as light gray color); and the environment image has the lowest brightness (shown as deep gray color). Because there may be a plurality of active objects in the indoor space 9, the control unit 14 determines the operational status of the temperature controller 8 according to the distribution of those active objects, such as their average distance, the nearest distance or the longest distance from the temperature controller 8.

Figure 5:
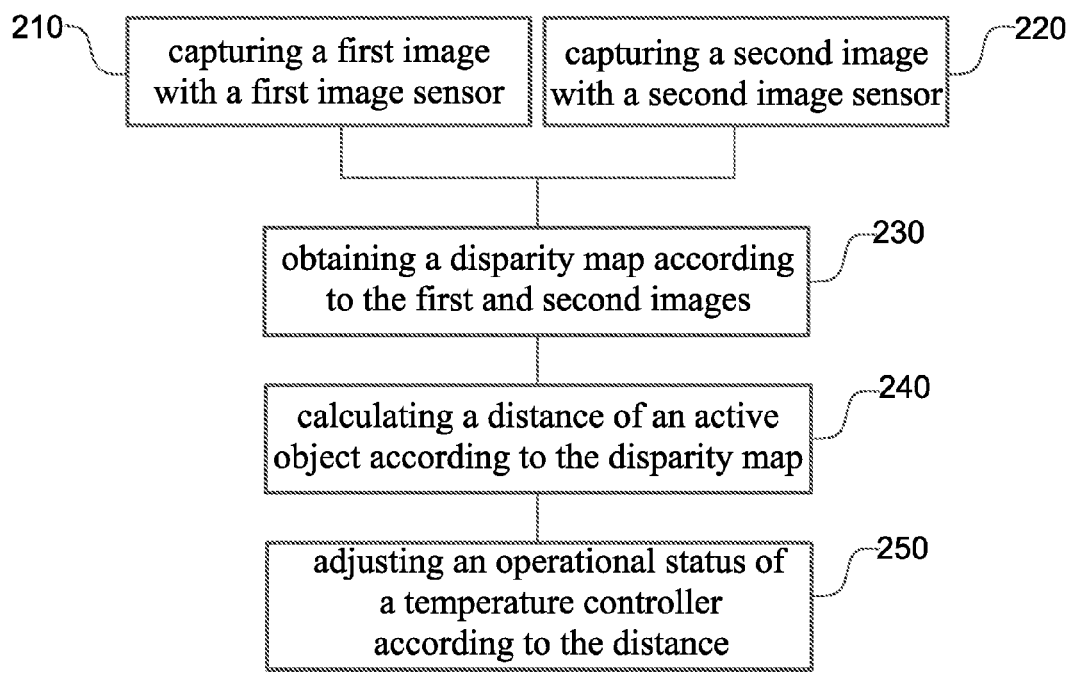
FIG. 5 shows a flow chart of the control method of a temperature controller according to the first embodiment of the present invention.

Please refer to FIG. 5, it shows a flow chart of the control method of a temperature controller according to the first embodiment of the present invention. The control method includes the steps of: capturing a first image with the first image sensor (step 210); capturing a second image with the second image sensor (step 220); obtaining a disparity map according to the first and second images (step 230); obtaining a distance of each active object from a temperature controller according to the disparity map (step 240); and determining an operational status of the temperature controller according to the distance. Details of the control method are already described in the aforementioned paragraphs and therefore will not be repeated again.

The second embodiment of the present invention relates to a home appliance control device and a control method thereof that may calculate a number, position, distance, activity level and activity range of at least one active object according to a comparison result between a current image acquired by an image sensor and a reference image or a reference data. The home appliance may be, for example, a temperature controller, a directivity loudspeaker, an electronic device having directivity (e.g. output direction) or other home appliances capable of determining an operation state thereof according to the number, position, distance, activity level and activity range of the active object.

Figure 6:
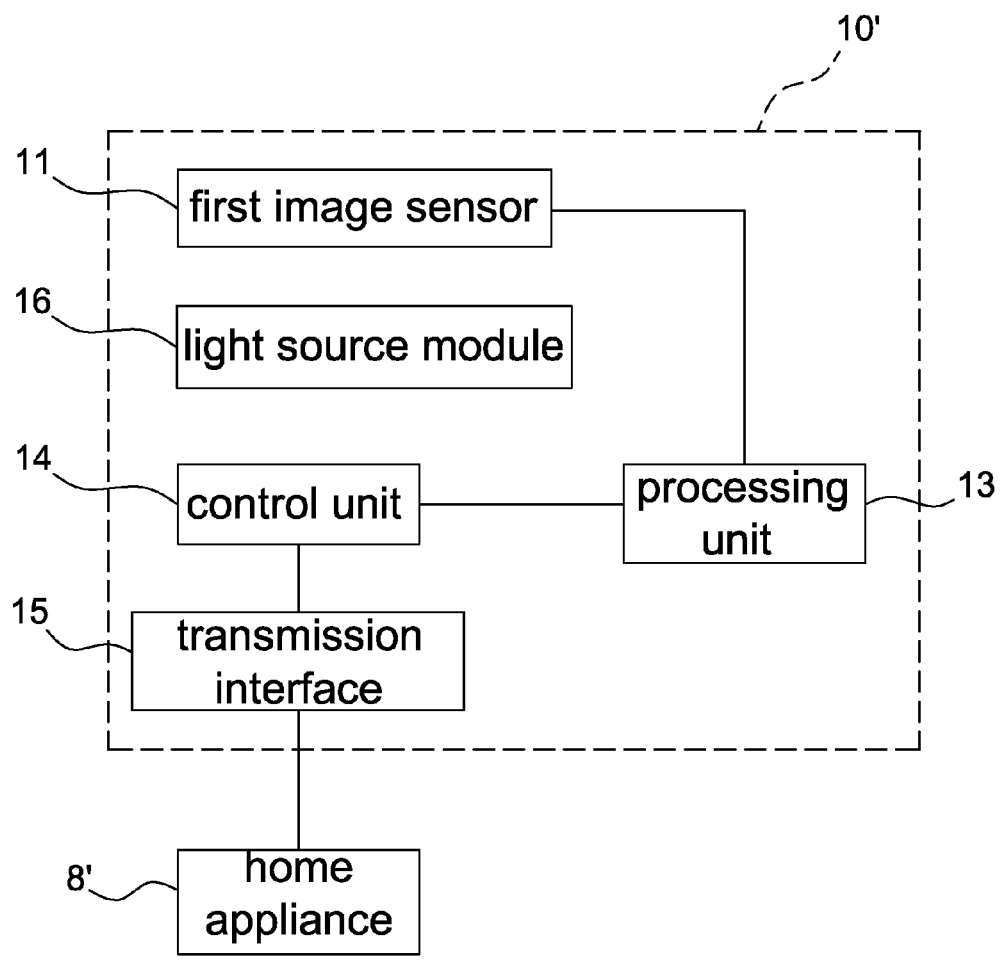
FIG. 6 shows a block diagram of the home appliance control device according to the second embodiment of the present invention.

Please refer to FIG. 6, it shows a block diagram of the home appliance control device according to the second embodiment of the present invention. The home appliance control device 10' includes a first image sensor 11, a processing unit 13, a control unit 14, a transmission interface unit 15 and a light source module 16; wherein the embodiment and operation of the first image sensor 11, control unit 14 and transmission interface unit 15 are similar to those of the first embodiment and thus details will not be repeated herein. In the second embodiment, the processing unit 13 compares a current image acquired by the first image sensor 11 with a reference image or a reference data previously stored, and obtains a static parameter including, for example the number, position and distance of the active object according to a comparison result; or compares a plurality of current images acquired by the first image sensor 11 with the reference image or the reference data previously stored, and obtains a dynamic parameter including, for example the activity level and activity range of the active object according to the comparison result. For example, the processing unit 13 may record every active object when obtaining the static parameter thereof, and then obtain a new static parameter of every active object and a variation of the static parameter after a predetermined period of time so as to obtain the dynamic parameter, i.e. the dynamic parameter may be obtained according to a variation of a plurality of static parameters. The control unit 14 then controls an operation state, e.g. the output and/or directivity, of a home appliance 8' through the transmission interface unit 15 according to the static parameter and the dynamic parameter. The reference image and the reference data are previously obtained and stored in the home appliance control device 10' according to a predetermined optical pattern projected by the light source module 16; wherein the predetermined optical pattern may be an optical diffraction pattern, but not limited thereto.

Figure 7:
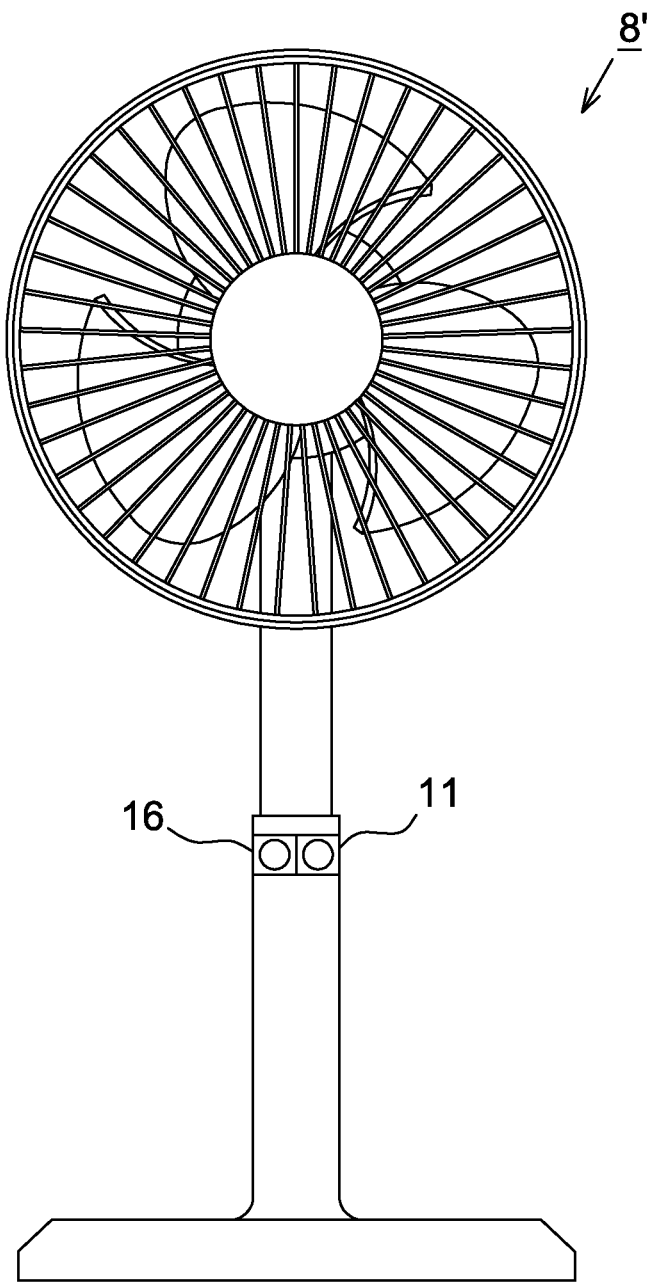
FIG. 7 shows a schematic diagram of a home appliance adopting the home appliance control device of the present invention.

Please refer to FIG. 7, it shows a schematic diagram of a home appliance 8' that adopts the home appliance control device 10' of the present invention, wherein the home appliance 8' is shown as a fan, but not limited thereto. The first image sensor 11 is preferably installed at a position capable of acquiring images of at least one active object. The light source module 16 is preferably installed at a position capable of projecting a predetermined optical pattern to at least one active object. In one embodiment, the light source module 16 and the first image sensor 11 are not installed coaxially, i.e. there is a transverse distance therebetween as shown in FIG. 7. In another embodiment, the light source module 16 and the first image sensor 11 are installed coaxially, i.e. there is no transverse distance therebetween. Other components of the home appliance control device 10' are disposed at proper positions of the home appliance 8' without particular limitation. Details of the second embodiment of the present invention will be described with different aspects hereinafter.

In a first aspect, the first image sensor 11 and the light source module 16 are not disposed coaxially, and the processing unit 13 calculates various parameters of each active object by using triangulation.

Figure 8A:
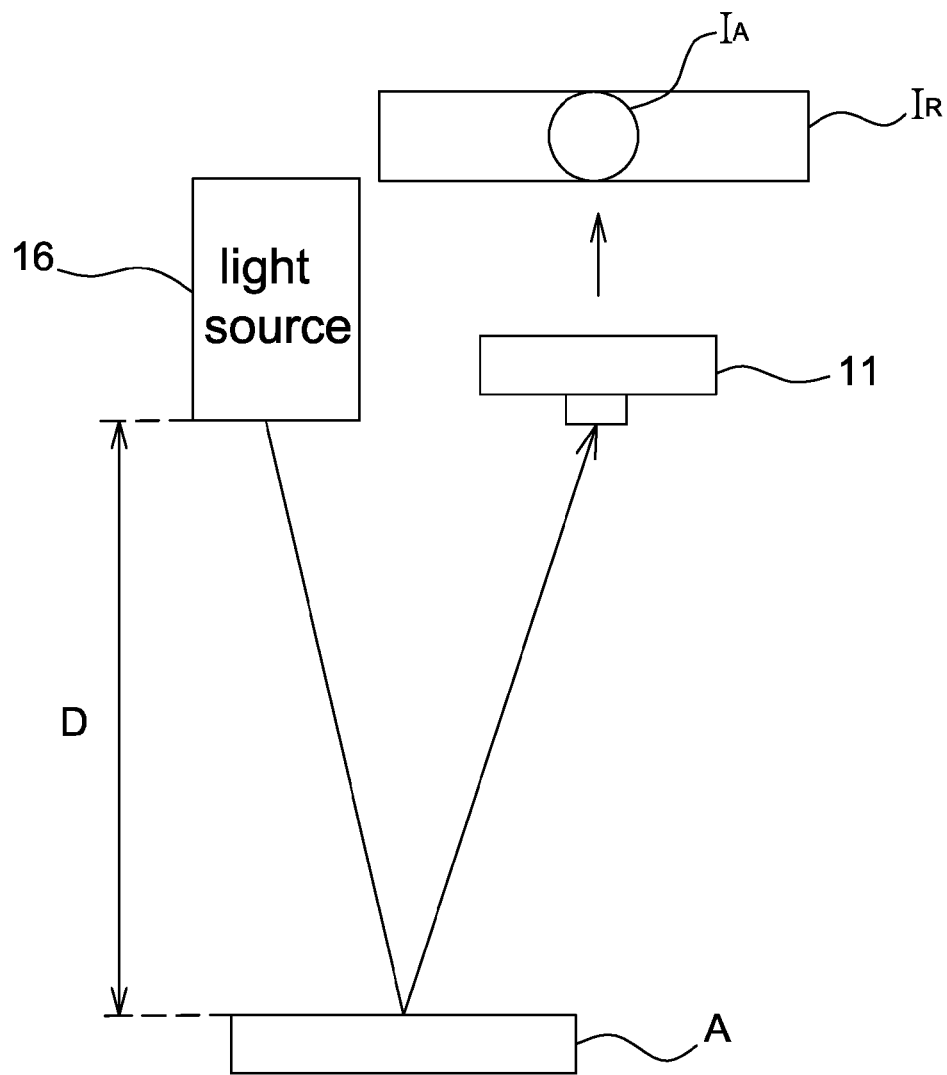
FIGS. 8A-8B show operational schematic diagrams of the home appliance control device according to a first aspect of the second embodiment of the present invention.
Figure 8B:
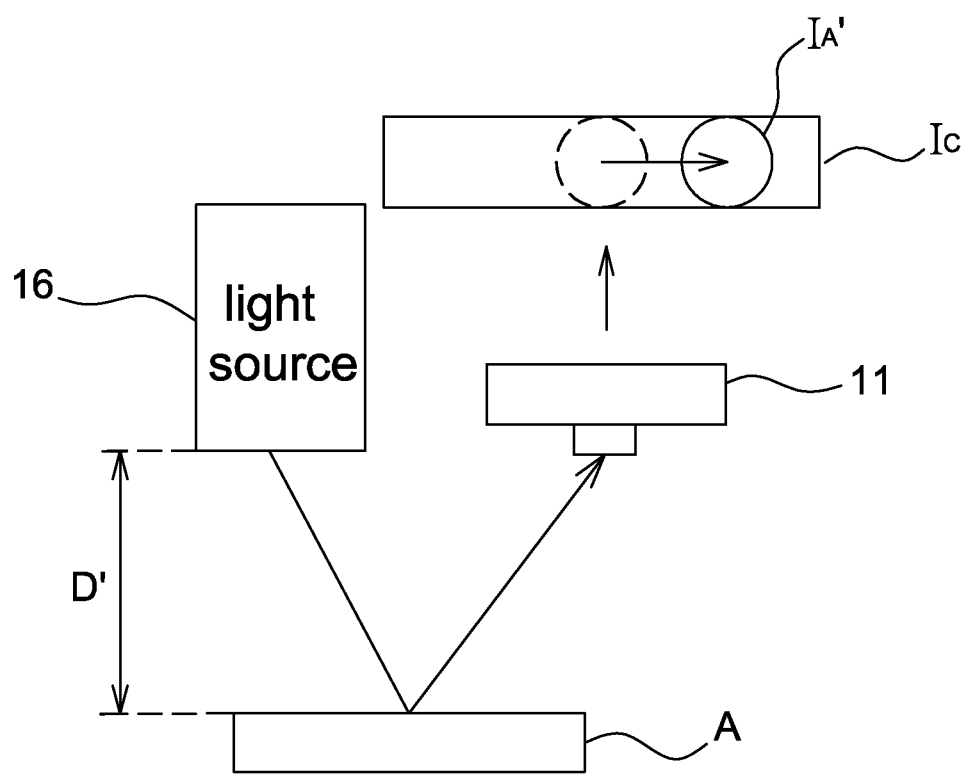

Please refer to FIGS. 8A and 8B, they show operational schematic diagrams of this aspect. FIG. 8A shows an operational schematic diagram in which an active object A is at a predetermined distance D, and the first image sensor 11 acquires a reference image $I_R$ to be stored in the processing unit 13, wherein the reference image $I_R$ may contain an active object image $I_A$ and a position thereof reflects the predetermined distance D. FIG. 8B shows, in actual operation, the active object A at a current distance D', which may be equal to, smaller or larger than the predetermined distance D. Based on triangulation calculation it is known that a position of the active object image $I_A'$ in a current image $I_C$ acquired by the first image sensor 11 will be different from the position of the active object image $I_A$ in the reference image $I_R$, and the processing unit 13 may obtain the current distance D', the position and the number of the active object A according to a displacement between the active object images $I_A$ and $I_A'$.

In another aspect, positions of the active object image $I_A$ in the reference image $I_R$ associated with different distances of the active object A may be formed as a look-up table and stored in the processing unit 13 previously. The static parameter, such as the distance, position and number of the active object A may be obtained according to the look-up table in actual operation. It is appreciated that the reference image $I_R$ or look-up table may be stored in other components of the home appliance control device 10' rather than the processing unit 13.

In this aspect, when the number of the active object is larger than 1, the processing unit 13 may obtain the static parameter of each active object according to a comparison result of one current image and the reference image (or the look-up table), and further obtains the dynamic parameter of each active object according to a comparison result of a plurality of current images and the reference image. The control unit 14 may control an operation state of the home appliance 8' according the static and dynamic parameters obtained by the processing unit 13; wherein definitions of the static and dynamic parameters are made above and thus details thereof will not be repeated herein. In addition, in this aspect the light source module 16 may be an infrared light source or a proper light source capable of projecting a predetermined optical pattern, e.g. an interference pattern, without particular limitation as long as the processing unit 13 is able to perform the triangulation calculation according to the current image acquired by the first image sensor 11. A method for calculating the depth of an active object by using triangulation may be referred to WO2007/043036, entitled "Method and system for object reconstruction".

In a second aspect, the processing unit 13 previously stores the point spread function (PSF) as a function of the depth or the reference image as a function of the depth to be served as a reference data. In this aspect, the light source module 16 may be an infrared light source configured to project a predetermined optical pattern, e.g. 2-dimensional grating pattern, but not limited thereto. The first image sensor 11 acquires current images by using fixed focus length and fixed aperture type. The processing unit 13 compares the current image with the reference data to obtain various parameters of each active object. In this aspect, the first image sensor 11 and the light source module 16 are preferably arranged coaxially and thus there is no transverse distance between the first image sensor 11 and the light source module 16.

Figure 9A:
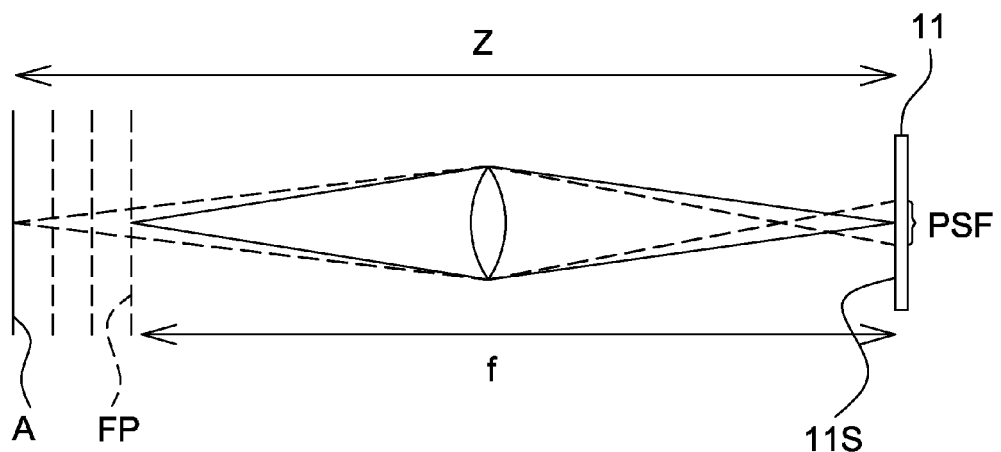
FIG. 9A shows an operational schematic diagram of the home appliance control device according to a second aspect of the second embodiment of the present invention.

Please refer to FIG. 9A, it shows an operational schematic diagram of the first image sensor 11 acquiring images in the second aspect, wherein a current image acquired by the first image sensor 11 may be expressed by equation (1), $$y = F(z, f, a) \otimes x \quad (1)$$

where y denotes the current image; z denotes an object distance; f denotes a focal length; a denotes an aperture type; $\otimes$ denotes the convolution symbol; x denotes a focused image, i.e. the predetermined optical pattern acquired at z=f as shown in FIG. 9A; wherein all parameters above are 2-dimensional parameters. As mentioned above, as the focal length f and the aperture type a are fixed in this aspect, equation (1) can be simplified to $y = F(z) \otimes x$. It is clear from the simplified equation that the reference data may be the point spread function F(z) associated with different object distances z, the reference images Y(z) associated with different object distances and/or the focused image x; wherein the information to be stored is determined according to the method used to calculate the object distance z.

Figure 9B:
FIG. 9B shows point spread functions acquired by the home appliance control device according to the second aspect of the second embodiment of the present invention, wherein the point spread functions vary with the object distance.

FIG. 9B shows the point spread function F(z) forming on a sensing surface 11S of the first image sensor 11 when an active object A is at different object distances z, wherein difference distances from the focal plane FP may obtain different PSF. It is known from FIG. 9B that the focused image x can be acquired at z=f, which has the smallest area of PSF, and the area of PSF becomes larger when the active object A is moving away from the focal plane FP, and near-defocusing and far-defocusing will have different PSF.

In this aspect, as the predetermined optical pattern projected by the light source module 16 is already known, i.e. x is already known, F(z) associated with different object distances may be obtained according to the reference image Y(z) of the active object at different object distances acquired by the first image sensor 11, wherein F(z) represents the PSF as a function of the depth. The reference data may include the characteristic parameter of F(z), e.g. the area or width.

In calculating the object distance z, corresponding point spread function F(z) or reference image Y(z) may be obtained by using deconvolution method, Fourier transform method or feature matching method according to a current image y acquired by the first image sensor 11. F(z) or Y(z) are compared with the reference data or look-up table so as to obtain the object distance z. As these mathematic methods are well known to the art, details thereof will not be repeated herein. It should be mentioned that different reference data may be stored previously corresponding to different methods being used to calculate the object distance z.

If the deconvolution method is used to calculate the depth, F(z) and/or the predetermined optical pattern x may be stored previously. For example, the predetermined optical pattern x may not be prestored if blind-deconvolution is used; on the contrary, the predetermined optical pattern x may be stored previously if blind-deconvolution is not used. In addition, if the predetermined optical pattern x has repetitive parts (e.g. chessboard distribution), only a part of the predetermined optical pattern x is stored previously, e.g. the repetitive unit.

If the Fourier transform method is used to calculate the depth, time domain or frequency domain information of F(z) and the predetermined optical pattern x may be stored previously. Similarly, if the predetermined optical pattern x contains repetitive parts, only the repetitive unit is stored previously.

If the feature matching method is used to calculate the depth, the original image or blur parameter of the reference image Y(z) may be stored previously, and the depth may be obtained the by comparing a current image y with the original image or blur parameter of the reference image Y(z) or the look-up table.

In a word, in this aspect as the processing unit 13 previously stores the reference data, which includes the reference image Y(z) acquired by the first image sensor 11 and/or the characteristic parameters of F(z), the static parameter of each active object may be obtained according to a comparison result between a current image y and the reference data, and the dynamic parameter may further be obtained according to a plurality of current images.

In addition, as each PSF is associated with two object distances z (as shown in FIG. 9B), in actual application the focal plane FP may be designed to relatively close to the home appliance control device 10' such that the distance of the active object is known to be larger than the focal plane FP. Although the aperture type is shown as pentagon herein, it is not used to limit the present invention.

Similarly, when the number of the active object is larger than 1, the processing unit 13 may obtain the static parameter of each active object according to a current image, and may obtain the dynamic parameter of each active object according to a plurality of current images.

Figure 10:
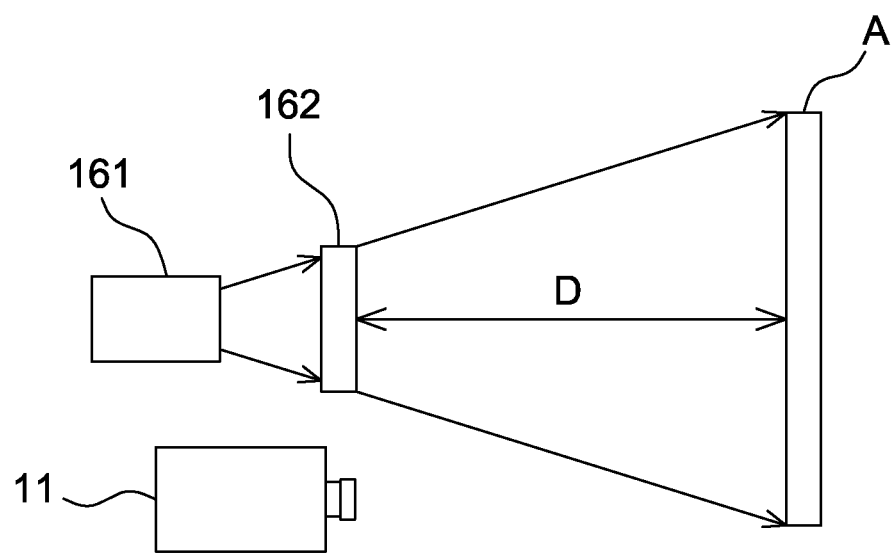
FIG. 10 shows an operational schematic diagram of the home appliance control device according to a third aspect of the second embodiment of the present invention.

In a third aspect, the first image sensor 11 and the light source module 16 are preferably disposed coaxially and thus there is no transverse distance therebetween as shown in FIG. 10. However, a spatial relation between the first image sensor 11 and the light source module 16 is only exemplary rather than limitation to the present invention. The light source module 16 includes, for example, a laser light source 161 and an optical component 162, e.g. a diffuser. The laser light emitted by the laser light source 161 generates a speckle pattern on the active object A after passing through the optical component 162, and this speckle pattern will change with the distance D. The home appliance control device 10' may previously store the reference data regarding the speckle pattern associated with different distances D. When the first image sensor 11 acquires a current image, the processing unit 13 may identify the distance D, the number and position of the active object A according to the speckle pattern on the current image. In addition, the optical component 162 may also be a 2-dimensional light grating or other components that can cause the light emitted by the laser light source 161 to generate distance-dependent speckle pattern after passing through the optical component 162. A method for identifying the distance of an active object according to the speckle pattern may be referred to U.S. patent publication number 2007/0216894, entitled "Range mapping using speckle decorrelation".

Similarly, when the number of the active object is larger than 1, the processing unit 13 may obtain the static parameter of each active object according to one current image, and obtain the dynamic parameter of each active object according to a plurality of the current images.

Therefore, the home appliance control method according to the second embodiment of the present invention includes the steps of: acquiring at least one current image with an image sensor (Step 310); comparing the current image with a reference image or a reference data (Step 320); obtaining a static parameter and a dynamic parameter according to a comparison result (Step 330); and adjusting an operation state of a home appliance according to the static and dynamic parameters (Step 340); wherein details of every steps have been described in the above aspects and will not be repeated herein.

Figure 12:
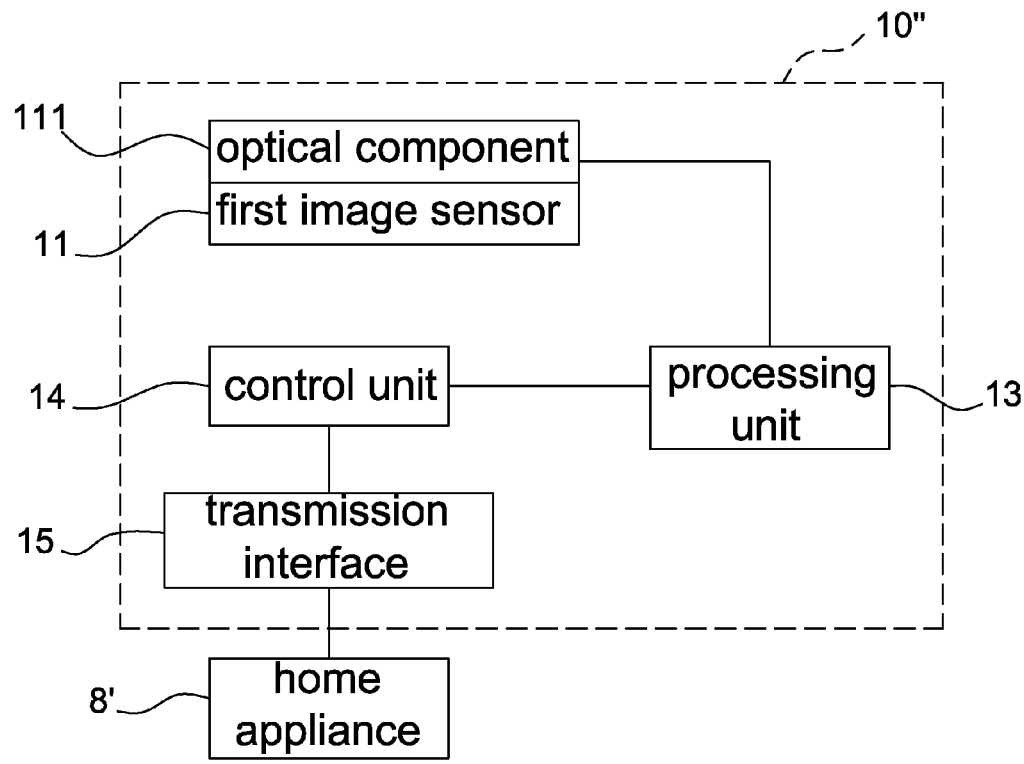
FIG. 12 shows a block diagram of the home appliance control device according to the third embodiment of the present invention.

Please refer to FIG. 12, it shows a block diagram of the home appliance control device according to the third embodiment of the present invention. The home appliance control device 10" includes a first image sensor 11, an optical component 111, a processing unit 13, a control unit 14 and a transmission interface unit 15; wherein the embodiment and operation of the first image sensor 11, control unit 14 and transmission interface unit 15 are similar to those of the first embodiment and thus details will not be repeated herein.

In the third embodiment of the present invention, the processing unit 13 compares a plurality of current images acquired by the first image sensor 11 with each other, or compares one or a plurality of current images with a reference data stored previously so as to obtain a static parameter including the number, position and distance, and a dynamic parameter including the activity level and activity range; as mentioned above the dynamic parameter may be obtained according to a variation of a plurality of static parameters. The optical component 11 may be, for example, a variable aperture, a variable focus or a coded aperture; wherein the light at different object distances may form different PSF after passing through the coded aperture, and the reference data may be the PSF of associated with difference object distances of the coded aperture, but not limited thereto.

In a first aspect, the optical component 111 may be, for example, a variable focus or a variable aperture. The first image sensor 11 acquires a plurality of current images respectively with different focus values or aperture values. For example, the first image sensor 11 acquires a first current image with a first focus value and a second current image with a second focus value, and the processing unit 13 obtains various parameters of the active object through mathematical calculation according to the first current image and the second current image. A method for obtaining the depth of an active object according to the current images acquired with different focus values may be referred to the published technique paper "Depth from defocus: A spatial domain approach," International Journal of Computer Vision, Vol. 13, No. 3, pp. 271-294 (1994). In other words, in this aspect the processing unit 13 may obtain the static parameter including a number, position and depth of the active object by using depth from defocus technique, and obtains the dynamic parameter according to a plurality of static parameters. For example, the depth of each active object may be obtained by using depth from defocus technique, and the number and position may further be determined according to different depths of the active object.

In addition, the first image sensor 11 may acquire a first current image with a first aperture value and a second current image with a second aperture value, and the processing unit 13 obtains various parameters of the active object through mathematical calculation according to the first current image and the second current image. A method for obtaining the depth of an active object according to the current images acquired with different aperture values may be referred to U.S. patent publication number 2010/0194870, entitled "Ultra-compact aperture controlled depth from defocus range sensor".

Similarly, when the number of the active object is larger than 1, the processing unit 13 may obtain the static parameter of each active object according to a plurality of current images (e.g. two current images) and obtain the dynamic parameter of each active object according to a plurality of current images (e.g. more than three current images); wherein the number of the current images mentioned is only exemplary rather than limitation to the present invention.

In a second aspect, the optical component 111 may be, for example, a variable focus, and the first image sensor 11 continuously acquires a plurality of current images and transmits them to the processing unit 13. When the processing unit 13 identifies a clearest current image, it may determine an object distance based on the focus length of the clearest current image; wherein the method for identifying the clearest current image may identify a current image having the smallest areas of PSF or the sharpest edges of the active object image, but not limited thereto. Therefore, in this aspect the processing unit 13 may control the optical component 111 to change its focus through the first image sensor 11 or directly controls the optical component 111 to change its focus until the first image sensor 11 acquires the clearest current image; wherein a focal length of the clearest current image may be referred to a depth of the active object herein. A method for determining the depth of an active object according to the clearest current image may be referred to a published technique paper "Depth from focus," Pattern Recognition Letters, pp. 63-69 (1987). In other words, in this aspect the processing unit 13 may obtain the static parameter including the number, position and distance of the active object, and further obtain the dynamic parameter according a plurality of static parameters.

Similarly, when the number of the active object is larger than 1, the processing unit 13 may obtain the static parameter of each active object respectively according to a plurality of clearest current images, and may obtain the dynamic parameter according to a plurality of clearest current images.

In a third aspect, the optical component 111 may be, for example, a coded aperture, and when the first image sensor 111 acquires images through the optical component 111, the active object at different object distances may generate different PSF through the optical component 111. The home appliance control device 10" may store the reference data of PSF associated with different object distances formed by the optical component 111, i.e. the reference data may be the PSF associated with different object distances of the coded aperture. When the first image sensor 11 acquires a current image containing the active object, the processing unit 13 may determine various parameters of the active object according to the PSF associated with the current image, e.g. the PSF may be determined by using deconvolution method according to the current image to accordingly determine various parameters. A method for determining the depth of an active object according to different PSF may be referred to the published technique paper "Image and depth from a conventional camera with a coded aperture," ACM Transactions on Graphics, vol. 26, No. 3, 2007.

Similarly, when the number of the active object is larger than 1, the processing unit 13 may obtain the static parameter of each active object according to a current image, and obtain the dynamic parameter of each active object according to a plurality of the current images.

Figure 13:
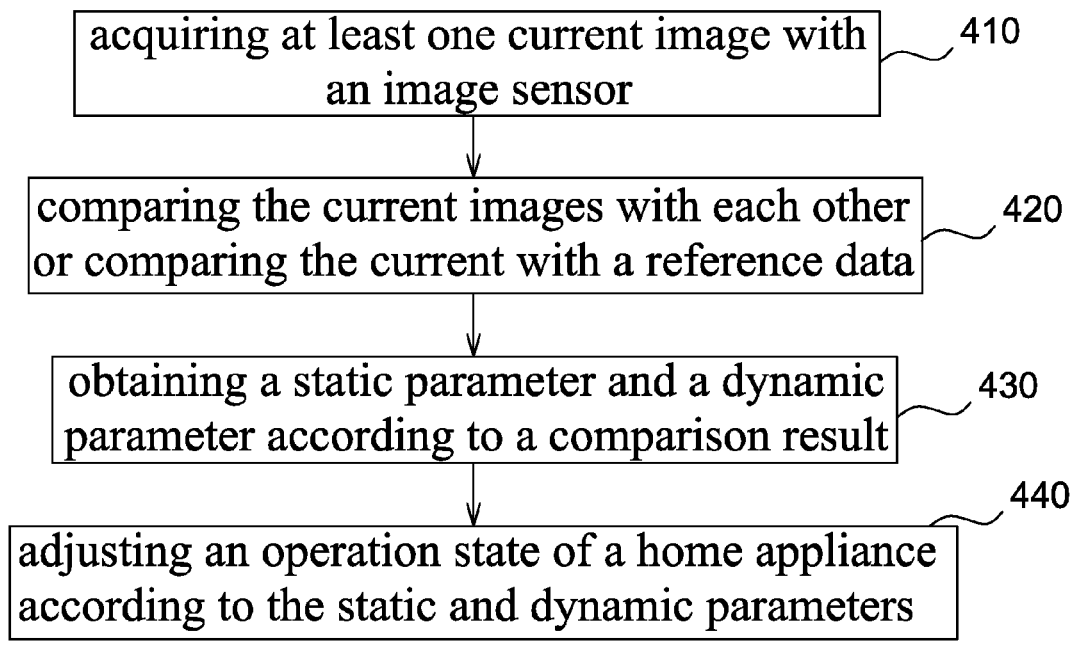
FIG. 13 shows a flow chart of the home appliance control method according to the third embodiment of the present invention.

Please refer to FIG. 13, the home appliance control method according to the third embodiment of the present invention includes the steps of: acquiring at least one current image with an image sensor (Step 410); comparing the current images with each other or comparing the current with a reference data (Step 420); obtaining a static parameter and a dynamic parameter according to a comparison result (Step 430); and adjusting an operation state of a home appliance according to the static and dynamic parameters (Step 440); wherein details of every steps have been described in the above aspects and thus will not be repeated herein.

Figure 11:
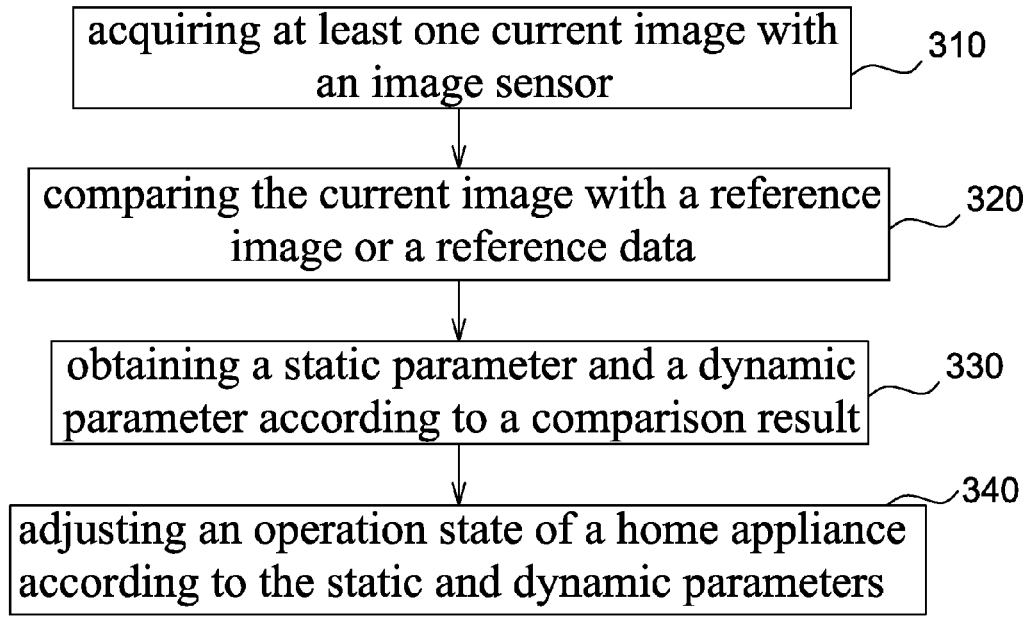
FIG. 11 shows a flow chart of the home appliance control method according to the second embodiment of the present invention.

As mentioned above, although conventional air conditioners can capture images with one infrared image sensor, it is not able to obtain the distance between the active object and the air conditioner in an indoor space. The present invention further provides a home appliance control device (FIGS. 6 and 12) and a home appliance control method (FIGS. 11 and 13) that may obtain various parameters of each active object according to a variation between a plurality of current images acquired by an image sensor or according to a relation of a current image acquired by the image sensor with respect to a reference image or a reference data so as to determine an operation state of a home appliance thereby optimizing the operation of the home appliance.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A home appliance control device for controlling an operation state of a home appliance, the home appliance control device comprising:
   a first image sensor comprising a variable aperture or a variable focus, and configured to acquire a plurality of current images of at least one active object through the variable aperture or the variable focus, wherein every current image corresponds to a different aperture value or focus value;
   a processing unit configured to
      control the first image sensor to acquire the current images respectively according to different focus values,
      identify a clearest current image to accordingly determine a static parameter associated with the active object and to obtain a dynamic parameter associated with the active object by comparing the current images, wherein the clearest current image is the current image having smallest point spread functions or sharpest edges; and a control unit for controlling the operation state of the home appliance according to the static parameter and the dynamic parameter.

2. The home appliance control device as claimed in claim 1, wherein the processing unit is configured to obtain the static parameter and the dynamic parameter by using depth from defocus technique according to the current images.

3. The home appliance control device as claimed in claim 1, wherein the dynamic parameter is obtained according to a variation of the static parameter, the static parameter is at least one of a number, a position and a distance of the active object, and the dynamic parameter is at least one of an activity level and an activity range of the active object.

4. The home appliance control device as claimed in claim 1, wherein the operation state is an output or a directivity of the home appliance.

5. The home appliance control device as claimed in claim 1, wherein the home appliance is a temperature controller, a directivity loudspeaker or a directivity electronic device.

6. The home appliance control device as claimed in claim 1, wherein the focus value associated with the clearest current image is a depth of the active object.

7. The home appliance control device as claimed in claim 1, wherein the processing unit is configured to further identify a plurality of static parameters associated with different active objects according to a plurality of clearest current images.

8. A home appliance control device for controlling an operation state of a home appliance, the home appliance control device comprising:

a first image sensor having a variable focus value and configured to acquire a plurality of current images of at least one active object;

a processing unit configured to control the first image sensor to acquire the current images respectively according to different focus values and identify a clearest current image to accordingly determine a static parameter associated with the active object, wherein the clearest current image is the current image having smallest point spread functions or sharpest edges; and a control unit configured to control the operation state of the home appliance according to the static parameter.

9. The home appliance control device as claimed in claim 8, wherein the processing unit is configured to obtain the static parameter by using depth from defocus technique according to the current images.

10. The home appliance control device as claimed in claim 8, wherein the static parameter is at least one of a number, a position and a distance of the active object.

11. The home appliance control device as claimed in claim 8, wherein the operation state is an output or a directivity of the home appliance.

12. The home appliance control device as claimed in claim 8, wherein the home appliance is a temperature controller, a directivity loudspeaker or a directivity electronic device.

13. The home appliance control device as claimed in claim 8, wherein the focus value associated with the clearest current image is a depth of the active object.

14. The home appliance control device as claimed in claim 8, wherein the processing unit is configured to further identify a plurality of static parameters associated with different active objects according to a plurality of clearest current images.

* * * * *